June 12, 1956  J. R. JOYCE  2,750,170

APPARATUS FOR MIXING A LIQUID AND A GAS

Filed Nov. 10, 1953 2 Sheets-Sheet 1

INVENTOR:
JOHN RUSKIN JOYCE
BY: Oswald R. Milmore
HIS ATTORNEY

June 12, 1956  J. R. JOYCE  2,750,170
APPARATUS FOR MIXING A LIQUID AND A GAS
Filed Nov. 10, 1953  2 Sheets-Sheet 2

INVENTOR:
JOHN RUSKIN JOYCE
BY: *Oswald H. Milmore*
HIS ATTORNEY

United States Patent Office 2,750,170
Patented June 12, 1956

2,750,170
APPARATUS FOR MIXING A LIQUID AND A GAS

John Ruskin Joyce, Thornton-le-Moors, England, assignor to Shell Development Company, Emeryville, Calif., a corporation of Delaware Application November 10, 1953, Serial No. 391,155

Claims priority, application Great Britain November 13, 1952

9 Claims. (Cl. 261—50)

This invention relates to apparatus for mixing a liquid and a gas by spraying the liquid into a stream of gas in the general direction of gas flow, e. g., for mixing liquid fuel and air for combustion or dispersing a liquid in gas for drying, etc. Such apparatus is hereinafter referred to as "apparatus of the type specified." The invention is particularly but not exclusively applicable to the construction of liquid fuel burners. In known apparatus of the type specified, the location of the zone wherein the liquid and the gas mix, the rate of mixing, and the degree of dispersion of the liquid in the gas, all of which are considered to contribute to the "quality of the mixing" as the expression is used herein, tend to vary with the rate of fluid flow. Thus, at increasing rates of fluid flow, the location of the mixing zone tends to recede in the direction of fluid flow from the point at which both air and liquid are first present in the fluid flow, and the rate of mixing and the degree of liquid dispersion tend to decrease, and vice versa. Hence known apparatus designed to give certain qualities of fluid mixing at a given rate of fluid flow fail to give these qualities of mixing at higher or lower rates of fluid flow. In other words, it is difficult to design known apparatus of the type specified, in which the quality of mixing is maintained over a range of flow rates.

The maintenance of a given quality of mixing is particularly important when the apparatus is a liquid fuel burner in which complete combustion and flame stabilization in a definite zone over a range of fuel feed rates are required. In the specification of my prior patent application, Serial No. 320,083, filed November 12, 1952, I have described a liquid fuel burner in which the fuel flow rate is varied in such a manner as to minimize the variation of the angle of the spray cone in which the liquid fuel enters the air stream, and the importance of maintaining this angle as nearly constant as possible is discussed.

One object of the present invention is to provide improved means for reducing variation in the spray cone angle of liquid fuel in a liquid fuel burner.

Another object of the present invention is to provide, in apparatus of the type specified, means for reducing the variations in the direction of gas flow with varying rate of gas flow and generally to maintain the quality of mixing substantially independent of the rates of fluid flow.

According to the present invention, in apparatus of the type specified, either the liquid or the gas or both flow through control means which impart to the flowing fluid or fluids, with increasing rate of flow, a successively increasing component of flow in a direction transverse to the general direction of fluid flow, in relation to the component of flow in a direction parallel to the general direction of fluid flow.

In preferred apparatus of the type specified, the construction and operation of the control means is similar in the case of the gas flow control and the liquid flow control.

Apparatus of the type specified according to the present invention may also have control means as defined above for controlling the gas flow and control means as described in my copending application, Serial No. 391,156 filed concurrently herewith, for controlling the liquid flow. In the case of burners, the liquid flow may also be controlled by any known type of burner construction or by the burner construction described in said copending patent application, Serial No. 320,083.

The invention is illustrated by way of example by the accompanying drawings in which Figure 1 is a diagrammatic longitudinal section through a burner or atomizer according to the present invention;

Figure 1:
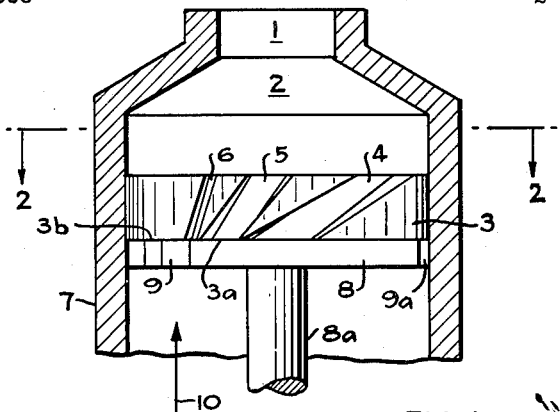

The burner or fuel atomizer shown in Figure 1 comprises a main body or casing 7 having an outlet orifice 1, a vortex chamber 2, a stationary barrier or whirler insert 3, the outer periphery of which except as hereinafter described, is in fluid-tight contact with the inner walls of the casing 7, and a rotatable control plate 8 carrying a rearwardly extending control shaft 8a. As stated above, Figure 1 is diagrammatic and it will be appreciated that for constructional convenience the burner will generally be provided with an orifice plate forming the front wall of the vortex chamber 2 that is separate from the wall defining the sides of said chamber and is situated within a casing or body; it will also be appreciated that locating means, which are not shown, will be required to locate the whirler insert 3 in fixed relation to the body or casing 7.

The barrier or whirler insert 3 has formed on its periphery a plurality of pairs of helical channels 4 and 4a, 5 and 5a, 6 and 6a, each pair being arranged as diametrically opposite sets of channels. Each channel forms, in combination with the associated part of the internal wall of the body or casing 7, a port by means of which fuel may flow into the vortex chamber 2. The obliquity of the channel or pitch of the helix differs from one channel to the next as indicated by the successively decreasing pitch or helix angles of channels 6, 5 and 4 shown in Figure 1. The cross sectional area preferably also differs from one channel to the next, channel 6 being the smallest and channel 4 the largest. Channels 6a, 5a and 4a correspond to channels 6, 5 and 4 respectively in size, disposition and pitch.

The control plate 8 has the form of a slotted disc which is in fluid-tight contact with the upstream face 3a of the whirler insert 3 in relation to which it can be rotated by means of a shaft 8a which is secured to the control plate. The control plate is circular for engagement with the inner wall of the casing 7 except for two arcuate peripheral slots 9 and 9a. As is clear from Figure 2, which shows the control plate 8 close to the minimum flow position, this plate can be positioned angularly in relation to the whirler insert 3 so that the slots 9 do not register with any of the channels or ports 4, 4a, 5, 5a, 6 and 6a. In this position no fuel can flow in the direction of the arrow 10 through the vortex chamber to the orifice 1. By turning the control plate 8 in a counter-clockwise direction as viewed in Figure 2, the leading edge of the slot 9 moves successively over the channels or ports 6, 5, 4 and the leading edge of the slot 9a moves simultaneously over the channels 6a, 5a, 4a, thereby bringing the channels cumulatively into register with the slots and providing successively increased fuel flow up to the maximum when all six channels are in register with the corresponding slots 9 or 9a.

It will be noted that as a result of the differing helical pitch of the channels or ports 6, 5, 4 or 6a, 5a, 4a, the downstream ends of the ports, i. e., the ends of the ports situated in the downstream face 3b of the whirler insert 3, are displaced circumferentially in a clockwise direction (looking in the direction of fluid flow) from the upstream ends of the ports, i. e., the ends of the ports situated in the face 3b of the whirler insert 3, to different distances; each displacement imparts to fluid flowing therethrough a component in a direction transverse to the longitudinal axis of the vortex chamber 2 or the general direction of fluid flow, thereby imparting an angular momentum of the fluid to cause rotation thereof about the longitudinal axis of the vortex chamber. Furthermore this displacement successively increases progressively from the ports 6 and 6a which give minimum fuel flow to the ports 4 and 4a which are open for maximum fuel flow.

As a result of the arrangement described, the successively increasing amount of fuel flowing through the ports 6, 6a, 5, 5a, 4 and 4a into the vortex chamber 2 has a successively increasing component of flow in a direction transverse to the general direction of fluid flow (the direction of the arrow 10 in Figure 1) in relation to its component of flow in a direction parallel to the general direction of fluid flow; in other words, it admits the fluid with an increasing angular momentum as the rate of admission is increased. It is this increasing transverse component of flow which diminishes the reduction of the spray cone angle which usually results from increasing fuel flow.

Figure 2:
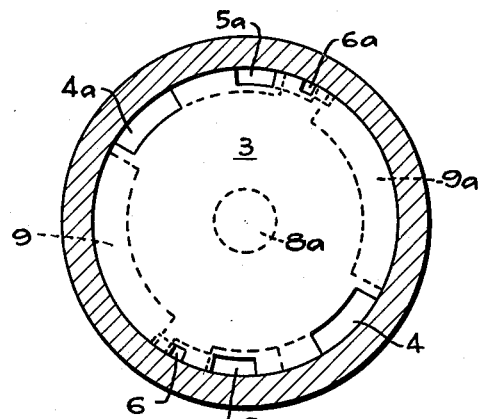
Figure 2 is a transverse section taken on the line 2—2 of Figure 1.
Figure 3:
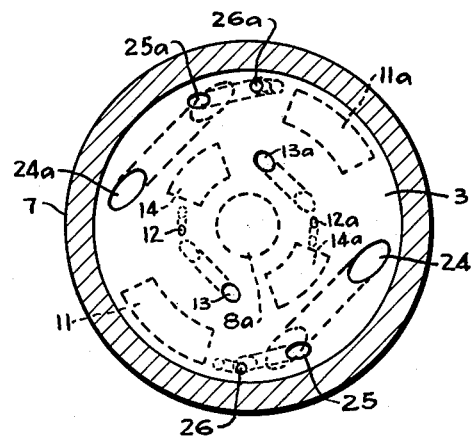
Figure 3 is a transverse section, corresponding to the section of Figure 2, of a modified construction.

In the burner shown in Figure 3, the peripheral channels of the burner shown in Figure 2 have been replaced by obliquely drilled ports 24, 24a, 25, 25a, 26 and 26a in the whirler insert 3 and the peripheral slots in the control plate 8 have been replaced by arcuate slots 11 and 11a. The varying obliquity of the ports provides the successively increasing transverse displacement of the downstream ends thereof in relation to their upstream ends and the optional though preferred progressive difference in the cross-sectional areas of these ports provides for increased flow rates when the plate 8, shown in the "off" position, is rotated counter-clockwise to uncover the ports cumulatively. The burner functions in the same way as that shown in Figures 1 and 2. Supplementary ports 12, 12a, 13 and 13a in the whirler insert with cooperating arcuate slots 14 and 14a in the control plate may also be provided if desired.

It will be appreciated that the barrier or whirler insert 3 and the control plate 8 together constitute the liquid flow controlling means.

An important advantage possessed by the burners of the present invention is the maintenance of a constant volume vortex chamber at all rates of fuel flow and at all whirl conditions. The constant volume of the vortex chamber assists in maintaining smooth fuel flow from the outlet orifice 1 and also in diminishing spray cone angle variation.

Although in the foregoing embodiments the channels or ports in the whirler insert are uncovered cumulatively, it is evident that this is not essential, e. g., the slots 9 and 9a may be short enough to move out of register with the channels 6 and 6a upon counter-clockwise rotation that uncovers the channels 4 and 4a.

Figure 4:
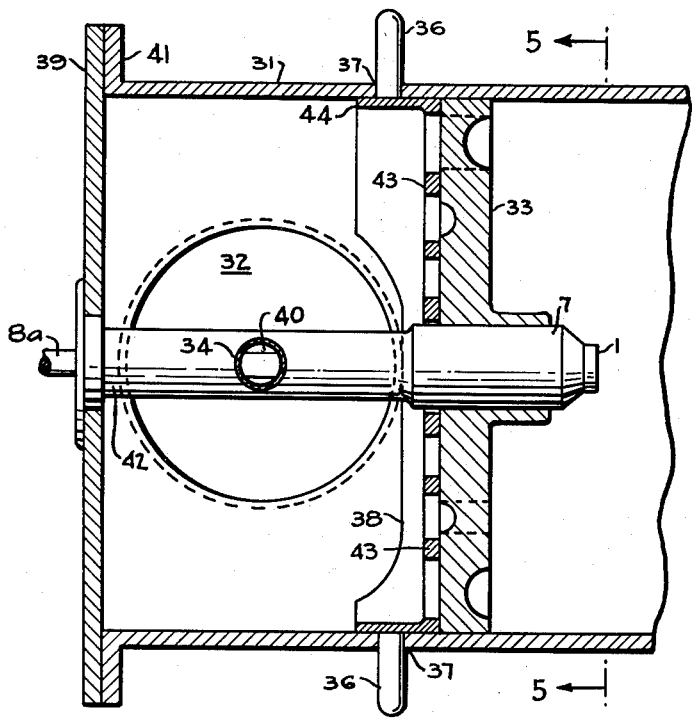
Figure 4 is a longitudinal section through a burner in which air flow is controlled by control means of construction and operation similar to the fuel flow control means shown in Figure 3 and is a section on the line 4—4 of Figure 5.
Figure 5:
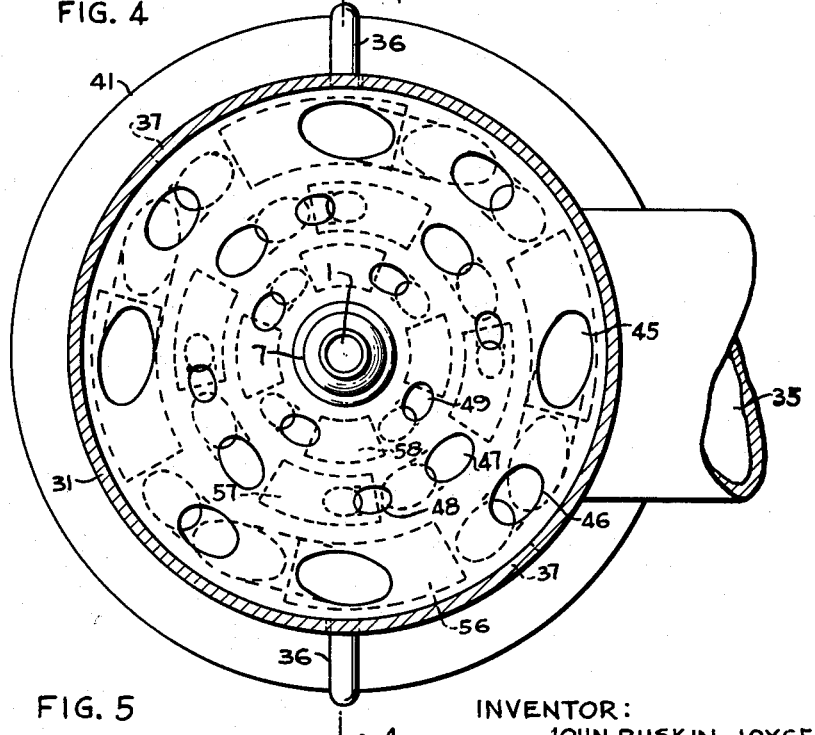
Figure 5 is a transverse section on the line 5—5 of Figure 4.

Turning now to Figures 4 and 5, a burner or fuel atomizer as shown in Figures 1 and 2 or as shown in Figure 3, and having a main body or casing 7 and outlet orifice 1, is supported by means of a barrier or whirler plate 33 substantially centrally of a casing 31 of circular cross section which may constitute a combustion chamber or may be merely a tubular insert in a furnace wall. The left-hand end of the casing 31 is provided with a flange 41 which accommodates a rear cover plate 39 through the center of which the control shaft 8a of the control plate 8 of the burner 7 passes. A tubular extension 42 of the burner main body 7 has one end supported by the plate 39. A side port 40 in the extension 42 is adapted to be connected with a fuel supply pipe 34 through which fuel under pressure flows to the burner 7. A shaft seal, not shown, is provided in the left-hand end of the extension 42 to prevent fuel leaking away around the control shaft 8a on the left-hand side as seen in Figure 4.

Air is admitted to the rear or upstream end of the chamber 31 through a side port 32 connected to an air duct 35. A control plate 43, having an annular flange 44 in sliding engagement with the casing 31 and carrying control levers 36 which project through peripheral slots 37 in the casing 31, is in substantially gas-tight contact with the upstream face of the barrier plate 33. The control plate 43 and barrier plate 33 constitute the flow control means for the air flow and are constructed and operate in a manner similar to whirler insert 3 and control plate 8 of Figure 3. The flange 44 of the control plate 43 is cut away as shown at 38 to allow limited turning of the plate 43 without obstruction of the port 32.

As can be seen in Figure 5, the downstream side of the plate 33 is provided with a number of obliquely formed ports arranged in four similar groups which are disposed symmetrically around the center of the plate; for the sake of brevity, only one of these groups of ports has reference numerals and is described in detail, namely the group of ports 45, 46, 47, 48 and 49; the description of this group applies to the other three groups. Each one of these ports has its downstream end displaced in a circumferentially clockwise direction (looking in the direction of air flow) from its upstream end. These ports are of different obliquities and, preferably, of different cross-sectional areas. Each group of ports cooperates with a group of arcuate slots formed in the control plate 43; of the four groups of slots, only one has reference numerals, namely a group of arcuate slots 56, 57 and 58.

The control plate 43 is shown in the position of minimum air flow where only the port 48, which is the port with the least obliquity and the smallest area, is in register with the associated arcuate slot 57. To increase air flow, the control plate 43 is turned in a counter-clockwise direction as viewed in Figure 5, thereby bringing slot 56 into register with port 46. At about the same time, the slot 57 is brought into register with the port 47 (cumulatively with the port 48) and the slot 58 is brought into register with port 49. The ports 46, 47 and 49 have greater obliquities than the port 48. In the position of maximum air flow, slot 56 is in register with ports 45 and 46, slot 57 is in register with port 47, but not port 48, and slot 58 is in register with slot 49. Port 45 has the greatest obliquity and is the largest.

It will be noted that although provision is made for completely cutting off the flow of liquid fuel in the burner 7, no such provision is made in respect of the air flow through the plates 43 and 33.

From the foregoing description it is evident that the liquid fuel is admitted from the fuel supply pipe 34, it flows through the extension 42 of the burner housing 7 to the control plate 8. The latter is traversed through the slots 9 and 9a (Figures 1–2) or slots 11, 11a and, if provided, slots 14 and 14a (Figure 3). Fuel then flows through the oblique channels or ports in the swirler insert that are, for any position of the plate 8, in register with the said slots. The fuel enters the vortex chamber 2, in which it rotates and from which it issues through the orifice 1 as a divergent cone. The rate of fuel discharge is controlled by rotating the control plate 8 by the control shaft 8a. When the control plate is rotated counter-clockwise (as viewed in Figures 2 and 3) channels or ports in the whirler insert 3 of progressively greater obliquity or reduced helix angle are uncovered; concomitantly, the total cross sectional area of the uncovered channels or ports is increased. Thereby the oil is given a greater angular momentum as the flow is increased, and the tendency of the spray cone angle to decrease at increasing flow rates is minimized.

When air is admitted from a suitable blower to the duct 35, it enters the casing 31 through the port 32 and traverses the control plate 43 and the barrier plate 33 through the ports in these respective plates that are in register. The air enters the downstream side of the barrier plate with a swirling, helical motion and is thereby mixed with the spray cone issuing from the burner 7. When the control plate is rotated in a counter-clockwise direction (as viewed in Figure 4) by the control levers 36, ports in the barrier plate of progressively greater obliquities are uncovered; concomitantly, the total cross sectional area of the uncovered ports is increased. The result is that the air is given a greater swirl or angular momentum as the flow is increased. Variations in the direction of gas movement in the region where it contacts the liquid are thereby reduced.

By thus coordinating the degree of air swirl with the rate of air flow, the quality of mixing is improved under varying flow conditions. It should be understood that the rates of fuel and air flow are in practice varied jointly so as to maintain a constant fuel-air ratio, or to maintain the ratio substantially constant. By this invention the flow patterns of both the liquid fuel spray and the combustion air are coordinated, leading to better flame control and efficiency of combustion.

By coupling the control levers 36 of the control plate 43 to the control shaft 8a of the control plate 8 through suitable mechanism, not shown, the burner is readily adapted for remote control.

It will be appreciated that the burner 7 may be replaced by one of a different type as indicated above, for example a burner as described in the specification of my copending application, Serial No. 320,083.

Spray drying apparatus is another example of apparatus which may advantageously be constructed in accordance with the present invention.

I claim as my invention:

1. Apparatus for mixing a liquid and a gas by spraying the liquid into a gas in the general direction of gas flow, comprising a gas casing for the flow of said gas having an inlet for admitting a gas thereto; guide means in said casing for imparting to said gas a component of flow in a direction transverse to the general direction of flow through the casing; a liquid atomizer situated within said casing having means for admitting a liquid thereto and an outlet directed to discharge liquid into said gas downstream from said guide means in the said general direction of flow; guide means in said atomizer for imparting to said liquid a component of flow in a direction transverse to the said general direction of flow; and control means adjustable in accordance with the total rate of flow of at least one of said fluids and cooperating with the guide means therefor for increasing the ratio of the component of flow of said one fluid in the said transverse direction to the component of flow in said general flow direction upon an increase in the said total flow rate and decreasing the said ratio upon a decrease in the said total flow rate.

2. Apparatus according to claim 1 wherein both said casing and atomizer have control means cooperating with the respective guide means therein for increasing the said imparted component of flow in a transverse direction to the gas and liquid, respectively, in accordance with the respective total rates of flow.

3. Apparatus according to claim 1 wherein the said guide means comprises a barrier in the path of flow of said one fluid having a plurality of ports extending between upstream and downstream sides thereof, the downstream end of each port being displaced from the upstream end thereof in a direction transverse to the said general direction of flow and the said displacements between the ends of different ports being progressively different but disposed in a common circumferential direction; and the control means includes a control member for closing at least some of said ports having greatest displacement between the ends thereof and for successively opening said closed ports while concomitantly increasing the total open port area for the flow of fluid through the barrier.

4. Apparatus for mixing a liquid and a gas by spraying the liquid into a gas in the general direction of gas flow, comprising a gas casing for the flow of said gas having an inlet for admitting a gas thereto; guide means in said casing for imparting to said gas a whirling motion about the axis of the casing; a liquid atomizer within said casing having means for admitting liquid thereto, a casing defining a vortex chamber and an outlet orifice situated substantially at the said axis of the casing and directed to discharge liquid into said gas downstream from said guide means along said axis in the general direction of flow of the gas; guide means for imparting to liquid entering said vortex chamber a whirling motion about the axis of said vortex chamber; and control means adjustable in accordance with the total rate of flow of at least one of said fluids and cooperating with the guide means therefor for increasing the said whirling motion of said one fluid upon an increase in the said total flow rate thereof and decreasing the said whirling motion thereof upon a decrease in the said total flow rate.

5. Apparatus according to claim 4 wherein both said casing and atomizer have control means for increasing the whirling motions of the gas and the liquid, respectively, as the total flow rates of said gas and liquid are respectively increased.

6. Apparatus according to claim 4 wherein the said control means comprises a barrier plate disposed in the path of flow of said one fluid having a plurality of ports extending between upstream and downstream sides thereof, the said ports being oblique with the downstream end of each port displaced from the upstream end thereof in a common circumferential direction, the obliquities of different ports being progressively different; and a control plate cooperating with said barrier plate having a part thereof adapted to close at least some of said ports having greatest obliquities and a flow passage through the control plate positioned to be moved successively into register with said ports in the barrier while concomitantly increasing the total port area in register with the said flow passage.

7. Apparatus for controlling the swirl of a fluid concomitantly with control of the total rate of flow thereof comprising an elongate casing having an inlet for the entry of said fluid; a barrier plate disposed transversely across said casing and having an upstream face toward said inlet and a downstream face, said barrier having a plurality of ports extending between the said upstream and downstream faces thereof, said ports being oblique with the downstream end of each port displaced from the upstream end thereof in a common circumferential direction, the obliquities of said ports being progressively different; and a control plate in engagement with the said upstream face of the barrier plate in substantially fluid-tight contact therewith and movable relatively thereto, said control plate having a part thereof adapted to cover at least some of said ports of greatest obliquities and a passageway adapted to be moved successively into register with the said ports while concomitantly placing a progressively increasing total port area into register with said pasageway.

8. Apparatus according to claim 7 wherein the said ports in the barrier plate are arranged in pairs with a pair of similar ports of like obliquity at diametrically opposite parts of the plate, the said control plate is rotatable, and the said passageway in the control plate includes diametrically oppositely located parts disposed to come into substantially simultaneous register with both ports of the same pair when the control plate is rotated.

9. Apparatus according to claim 7 wherein the said ports in the barrier plate are of different cross sectional areas, the port of greatest obliquity being the largest.

References Cited in the file of this patent
UNITED STATES PATENTS

| | | |
|---|---|---|
| 1,087,768 | Hoffman | Feb. 17, 1914 |
| 1,183,430 | Cameron | May 16, 1916 |
| 1,692,853 | Mulholland | Nov. 27, 1928 |
| 1,706,316 | Norton et al. | Mar. 19, 1929 |
| 2,674,493 | Raskin et al. | Apr. 6, 1954 |